United States Patent
Drexler et al.

(10) Patent No.: US 11,520,333 B1
(45) Date of Patent: Dec. 6, 2022

(54) SYSTEMS AND METHODS FOR OPERATING ROBOTIC EQUIPMENT IN CONTROLLED ZONES

(71) Applicant: Clearpath Robotics Inc., Kitchener (CA)

(72) Inventors: Simon Drexler, Puslinch (CA); Ryan Christopher Gariepy, Kitchener (CA)

(73) Assignee: Clearpath Robotics Inc., Kitchener (CA)

( * ) Notice: Subject to any disclaimer, the term of this patent is extended or adjusted under 35 U.S.C. 154(b) by 0 days.

(21) Appl. No.: 17/835,420

(22) Filed: Jun. 8, 2022

Related U.S. Application Data

(63) Continuation of application No. 16/176,674, filed on Oct. 31, 2018, now Pat. No. 11,392,121.

(60) Provisional application No. 62/579,408, filed on Oct. 31, 2017.

(51) Int. Cl.
| | |
|---|---|
| *G05D 1/00* | (2006.01) |
| *G05D 1/02* | (2020.01) |
| *B25J 5/00* | (2006.01) |
| *B25J 9/16* | (2006.01) |
| *G01C 21/32* | (2006.01) |

(52) U.S. Cl.
CPC ............ *G05D 1/0088* (2013.01); *B25J 5/007* (2013.01); *B25J 9/1676* (2013.01); *G01C 21/32* (2013.01); *G05D 1/0274* (2013.01); *G05D 2201/0216* (2013.01)

(58) Field of Classification Search
CPC ............... G05D 1/0088; G05D 1/0274; G05D 2201/0216; B25J 5/007; B25J 9/1676; G01C 21/32
See application file for complete search history.

(56) References Cited

U.S. PATENT DOCUMENTS

| | | | |
|---|---|---|---|
| 5,023,790 A | 6/1991 | Luke, Jr. | |
| 6,315,513 B1 | 11/2001 | Harukawa et al. | |
| 6,463,360 B1 | 10/2002 | Terada et al. | |
| 7,693,757 B2 | 4/2010 | Zimmerman | |

(Continued)

FOREIGN PATENT DOCUMENTS

WO 2011146259 A2 11/2011

OTHER PUBLICATIONS http://www.digitalglobe.com/downloaded on May 6, 2014.
(Continued)

*Primary Examiner* — Ig T An
(74) *Attorney, Agent, or Firm* — Bereskin & Parr LLP/S.E.C.R.L., s.r.l.

(57) ABSTRACT

Systems and methods for operating robotic equipment in a controlled zone are presented. The system comprises one or more self-driving material-transport vehicles having at least one sensor, non-transitory computer-readable media, and a processor in communication with the at least one sensor and media. The media stores computer instructions that configure the processor to move the vehicle towards the controlled zone in a normal mode of operation, capture environmental data associated with the controlled zone using the at least one sensor, determine environmental-change data based on comparing the captured environmental data with known-good environmental data, and operating the vehicle in a safe mode of operation based on the environmental-change data.

20 Claims, 4 Drawing Sheets

(56) References Cited

U.S. PATENT DOCUMENTS

| | | |
|---|---|---|
| 8,190,295 B1 | 5/2012 | Garretson et al. |
| 8,634,981 B1 | 1/2014 | Hyde et al. |
| 8,694,193 B2 | 4/2014 | Mkel et al. |
| 9,280,153 B1 | 3/2016 | Palamarchuk et al. |
| 9,465,388 B1 | 10/2016 | Fairfield et al. |
| 9,486,917 B2 | 11/2016 | Reid et al. |
| 9,487,356 B1 | 11/2016 | Aggarwal |
| 9,632,502 B1 | 4/2017 | Levinson et al. |
| 9,928,749 B2 | 3/2018 | Gil et al. |
| RE47,108 E | 10/2018 | Jacobus et al. |
| 10,112,771 B2 | 10/2018 | D'Andrea et al. |
| 10,317,119 B2 | 6/2019 | Zou |
| 10,328,769 B2 | 6/2019 | Ferguson et al. |
| 10,577,199 B2 | 3/2020 | Lee et al. |
| 2002/0154974 A1 | 10/2002 | Fukuda et al. |
| 2004/0158355 A1* | 8/2004 | Holmqvist ........... G05D 1/0236 |
| | | 701/23 |
| 2005/0216126 A1 | 9/2005 | Koselka et al. |
| 2007/0106306 A1 | 5/2007 | Bodduluri et al. |
| 2007/0294029 A1 | 12/2007 | D'Andrea et al. |
| 2008/0183599 A1 | 7/2008 | Hill et al. |
| 2009/0012667 A1 | 1/2009 | Matsumoto et al. |
| 2009/0043440 A1 | 2/2009 | Matsukawa et al. |
| 2010/0021272 A1 | 1/2010 | Ward et al. |
| 2010/0030417 A1 | 2/2010 | Fang et al. |
| 2010/0030466 A1 | 2/2010 | Rogers et al. |
| 2010/0049391 A1 | 2/2010 | Nakano |
| 2010/0106356 A1 | 4/2010 | Trepagnier et al. |
| 2010/0206651 A1 | 8/2010 | Nagasaka |
| 2010/0316470 A1 | 12/2010 | Lert et al. |
| 2012/0173018 A1 | 7/2012 | Allen et al. |
| 2012/0197464 A1 | 8/2012 | Lai et al. |
| 2012/0296471 A1 | 11/2012 | Inaba et al. |
| 2013/0054133 A1 | 2/2013 | Lewis et al. |
| 2013/0086215 A1 | 4/2013 | Trotta et al. |
| 2013/0226340 A1 | 8/2013 | Buchstab |
| 2013/0231779 A1 | 9/2013 | Purkayastha et al. |
| 2014/0040431 A1 | 2/2014 | Rao et al. |
| 2014/0244004 A1* | 8/2014 | Scott ..................... B25J 9/1676 |
| | | 700/56 |
| 2014/0309833 A1 | 10/2014 | Ferguson et al. |
| 2014/0350725 A1 | 11/2014 | LaFary et al. |
| 2014/0365258 A1 | 12/2014 | Vestal et al. |
| 2015/0032252 A1 | 1/2015 | Galluzzo et al. |
| 2015/0088310 A1 | 3/2015 | Pinter et al. |
| 2015/0197009 A1 | 7/2015 | Melikian |
| 2015/0217455 A1 | 8/2015 | Kikkeri et al. |
| 2015/0248131 A1 | 9/2015 | Fairfield et al. |
| 2015/0352721 A1 | 12/2015 | Wicks et al. |
| 2016/0086494 A1 | 3/2016 | Anandayuvaraj et al. |
| 2016/0101940 A1* | 4/2016 | Grinnell ............... G05D 1/0289 |
| | | 700/218 |
| 2016/0246301 A1 | 8/2016 | Kazama et al. |
| 2016/0271800 A1 | 9/2016 | Stubbs et al. |
| 2016/0327951 A1 | 11/2016 | Walton et al. |
| 2017/0039765 A1 | 2/2017 | Zhou et al. |
| 2017/0100837 A1 | 4/2017 | Zevenbergen et al. |
| 2017/0113352 A1 | 4/2017 | Lutz et al. |
| 2017/0168488 A1 | 6/2017 | Wierzynski et al. |
| 2017/0308096 A1 | 10/2017 | Nusser et al. |
| 2017/0341236 A1 | 11/2017 | Patrick et al. |
| 2018/0001474 A1 | 1/2018 | Sinyavskiy et al. |
| 2018/0009000 A1 | 1/2018 | Shang et al. |
| 2018/0060765 A1 | 3/2018 | Hance et al. |
| 2018/0086575 A1 | 3/2018 | Mccarthy et al. |
| 2018/0264648 A1 | 9/2018 | Kim et al. |
| 2018/0305125 A1 | 10/2018 | Guo et al. |
| 2018/0362270 A1 | 12/2018 | Clucas et al. |
| 2020/0047343 A1* | 2/2020 | Bal ..................... G05D 1/0219 |
| 2020/0206928 A1* | 7/2020 | Denenberg ........... G01S 7/4808 |

OTHER PUBLICATIONS

Wikipedia Vehicular Automation, https://web.archive.org/web/20140402022211/https://en.wikipedia.org/wiki/vehicular_automation, retrieved by Archive.org on Apr. 2, 2014 (Year: 2014).

* cited by examiner

SYSTEMS AND METHODS FOR OPERATING ROBOTIC EQUIPMENT IN CONTROLLED ZONES

CROSS-REFERENCE TO RELATED APPLICATIONS

This application is a continuation of U.S. patent application Ser. No. 16/176,674, filed 31 Oct. 2018, which claims the benefit of U.S. Provisional Patent Application No. 62/579,408, filed 31 Oct. 2017, and titled "SYSTEMS AND METHODS FOR OPERATING ROBOTIC EQUIPMENT IN CONTROLLED ZONES". The complete disclosure of each of U.S. patent application Ser. No. 16/176,674 and U.S. Provisional Patent Application No. 62/579,408 is incorporated herein by reference for all purposes.

TECHNICAL FIELD

The described embodiments relate to operation of industrial machines, and in particular to the operation of robotic equipment in controlled zones within an industrial facility.

BACKGROUND

Industrial facilities such as factories and warehouses employ automated and autonomous machines for various tasks in manufacturing, assembly, packaging, and shipping. These machines generally operate within industrial facilities along with humans. Accordingly, safety is a concern whenever powerful, fast, or otherwise dangerous machines are operating in close proximity to humans.

One solution for improving safety in industrial facilities is to use machinery within controlled zone within the facility. Generally, a controlled zone is one in which human interaction is minimized. For example, humans may be forbidden from entering a controlled zone while a stationary machine is operating within the controlled zone.

Humans may be required, for example, to delivery parts to or picking up work products from a machine within a controlled zone. As such, human discretion is required in order to prevent a human from entering the controlled zone. However, with the introduction of self-driving material-transport vehicles that are capable of delivery and pick-up, there remains a need to maintain safety in controlled zones without relying solely on human discretion.

SUMMARY

The various embodiments described herein generally relate to methods (and associated systems configured to implement the methods) for operating robotic equipment in a controlled zone. In a first aspect, the method comprises moving the robotic equipment towards the controlled zone in a normal mode of operation, capturing environmental data associated with the controlled zone, determining environmental-change data by comparing the captured environmental data with known-good environmental data, and operating the robotic equipment in a safe mode of operation based on the environmental-change data.

According to some embodiments, the robotic equipment comprises a self-driving material-transport vehicle.

According to some embodiments, the safe mode of operation prevents the vehicle from entering the controlled zone.

According to some embodiments, the vehicle has a maximum speed and the safe mode of operation comprises limiting the maximum speed below the maximum speed of the normal mode of operation.

According to some embodiments, the robotic equipment further comprises a robotic manipulator arm mounted on the self-driving material-transport vehicle.

According to some embodiments, the safe mode of operation prevents movement of the robotic manipulator arm.

According to some embodiments, capturing environmental data comprises capturing an image of the controlled zone, and the known-good environmental data comprises a known-good image of the controlled zone.

According to some embodiments, the method further comprises determining that controls are applied to the controlled zone.

In a second aspect, there is a self-driving vehicle for operating within a controlled zone. The vehicle comprises a chassis, at least one drive motor mounted on the chassis for driving at least one drive wheel, at least one sensor mounted on the chassis, a processor in communication with the at least one drive motor and at least one sensor, and non-transient computer-readable media in communication with the processor. The media store one or more instructions that, when executed on the processor, configure the processor to move the vehicle towards the controlled zone in a normal mode of operation, capture environmental data associated with the controlled zone using the at least one sensor, determine environmental-change data based on comparing the captured environmental data with known-good environmental data, and operate the vehicle in a safe mode of operation based on the environmental change data.

According to some embodiments, at least one sensor comprises a LiDAR device and the captured environmental data comprise LiDAR scan data.

According to some embodiments, the at least one sensor comprises a camera and the captured environmental data comprise an image.

According to some embodiments, the vehicle further comprises a manipulator arm mounted on the chassis.

According to some embodiments, the safe mode of operation prevents movement of the manipulator arm.

According to some embodiments, the at least one sensor comprises a thermal sensor and the captured environmental data comprise a temperature.

According to some embodiments, the media further store an electronic map of an industrial facility comprising the controlled zone, the map comprising data indicative of the controlled zone.

According to some embodiments, the instructions comprise instructions that, when executed on the processor, configure the processor to determine that the vehicle is within a proximity of the controlled zone based on the map data, such that the processor is configured to capture the environmental data based on the determination that the vehicle is within the proximity of the controlled zone.

According to some embodiments, the media further store an electronic map of an industrial facility comprising an inspection location associated with the controlled zone.

According to some embodiments, the instructions comprise instructions that, when executed on the processor, configure the processor to determine that the vehicle is at the inspection location based on the map data, such that the processor is configured to capture the environmental data based on the determination that the vehicle is at the inspection location.

BRIEF DESCRIPTION OF THE DRAWINGS

A preferred embodiment of the present invention will now be described in detail with reference to the drawings, in which.

DETAILED DESCRIPTION

Figure 1:
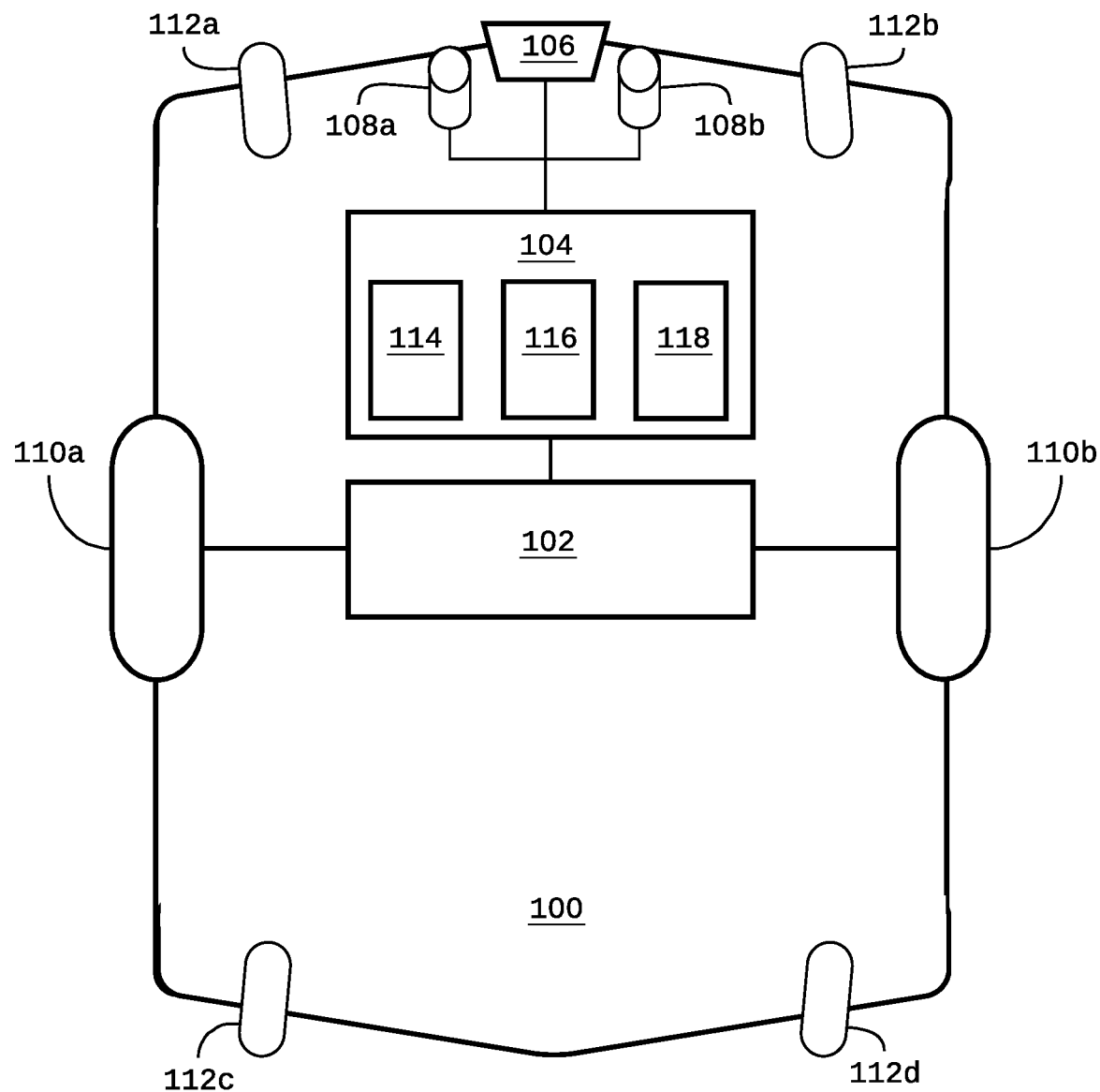
FIG. 1 is a system diagram of a self-driving material-transport vehicle, according to some embodiments.

Referring to FIG. 1, there is shown a self-driving material-transport vehicle 100 according to some embodiments. The vehicle comprises a drive system 102, a control system 104, and one or more sensors 106, 108*a*, and 108*b*.

The drive system 102 includes a motor and/or brakes connected to drive wheels 110*a* and 110*b* for driving the vehicle 100. According to some embodiments, the motor may be an electric motor, combustion engine, or a combination/hybrid thereof. Depending on the particular embodiment, the drive system 102 may also include control interfaces that can be used for controlling the drive system 102. For example, the drive system 102 may be controlled to drive the drive wheel 110*a* at a different speed than the drive wheel 110*b* in order to turn the vehicle 100. Different embodiments may use different numbers of drive wheels, such as two, three, four, etc.

According to some embodiments, additional wheels 112 may be included (as shown in FIG. 1, the wheels 112*a*, 112*b*, 112*c*, and 112*d* may be collectively referred to as the wheels 112). Any or all of the additional wheels 112 may be wheels that are capable of allowing the vehicle 100 to turn, such as castors, omni-directional wheels, and mecanum wheels.

The control system 104 comprises a processor 114, a memory 116, and a computer-readable non-transitory medium 118. The controls system 104 is in communication with (or includes) a communications transceiver (not shown) for communications with other systems, such as a fleet-management system.

One or more sensors 106, 108*a*, and 108*b* may be included in the vehicle 100. For example, according to some embodiments, the sensor 106 may be a LiDAR device (or other optical/laser, sonar, or radar range-finding sensor). The sensors 108*a* and 108*b* may be optical sensors, such as video cameras. According to some embodiments, the sensors 108*a* and 108*b* may be optical sensors arranged as a pair in order to provide three-dimensional (e.g. binocular or RGB-D) imaging.

The control system 104 uses the medium 118 to store computer programs that are executable by the processor 114 (e.g. using the memory 116) so that the control system 104 can provide automated or autonomous operation to the vehicle 100. Furthermore, the control system 104 may also store an electronic map that represents the known environment of the vehicle 100, such as a manufacturing facility, in the media 118.

For example, the control system 104 may plan a path for the vehicle 100 based on a known destination location and the known location of the vehicle. Based on the planned path, the control system 104 may control the drive system 102 in order to drive the vehicle 100 along the planned path. As the vehicle 100 is driven along the planned path, the sensors 106, and/or 108*a* and 108*b* may update the control system 104 with new images of the vehicle's environment, thereby tracking the vehicle's progress along the planned path and updating the vehicle's location.

Since the control system 104 receives updated images of the vehicle's environment, and since the control system 104 is able to autonomously plan the vehicle's path and control the drive system 102, the control system 104 is able to determine when there is an obstacle in the vehicle's path, plan a new path around the obstacle, and then drive the vehicle 100 around the obstacle according to the new path.

According to some embodiments, the vehicle 100 may receive a mission from a fleet-management system or other external computer system in communication with the vehicle 100 (e.g. in communication via the transceiver 120). In this case, the mission contains one or more waypoints or destination locations. Based on the waypoint or destination location contained in the mission, the vehicle 100, based on the control system 104, can autonomously navigate to the waypoint or destination location without receiving any other instructions from an external system. For example, the control system 104, along with the sensors 106, and/or 108*a*, and 108*b*, enable the vehicle 100 to navigate without any additional navigational aids such as navigational targets, magnetic strips, or paint/tape traces installed in the environment in order to guide the vehicle 100.

Figure 2:
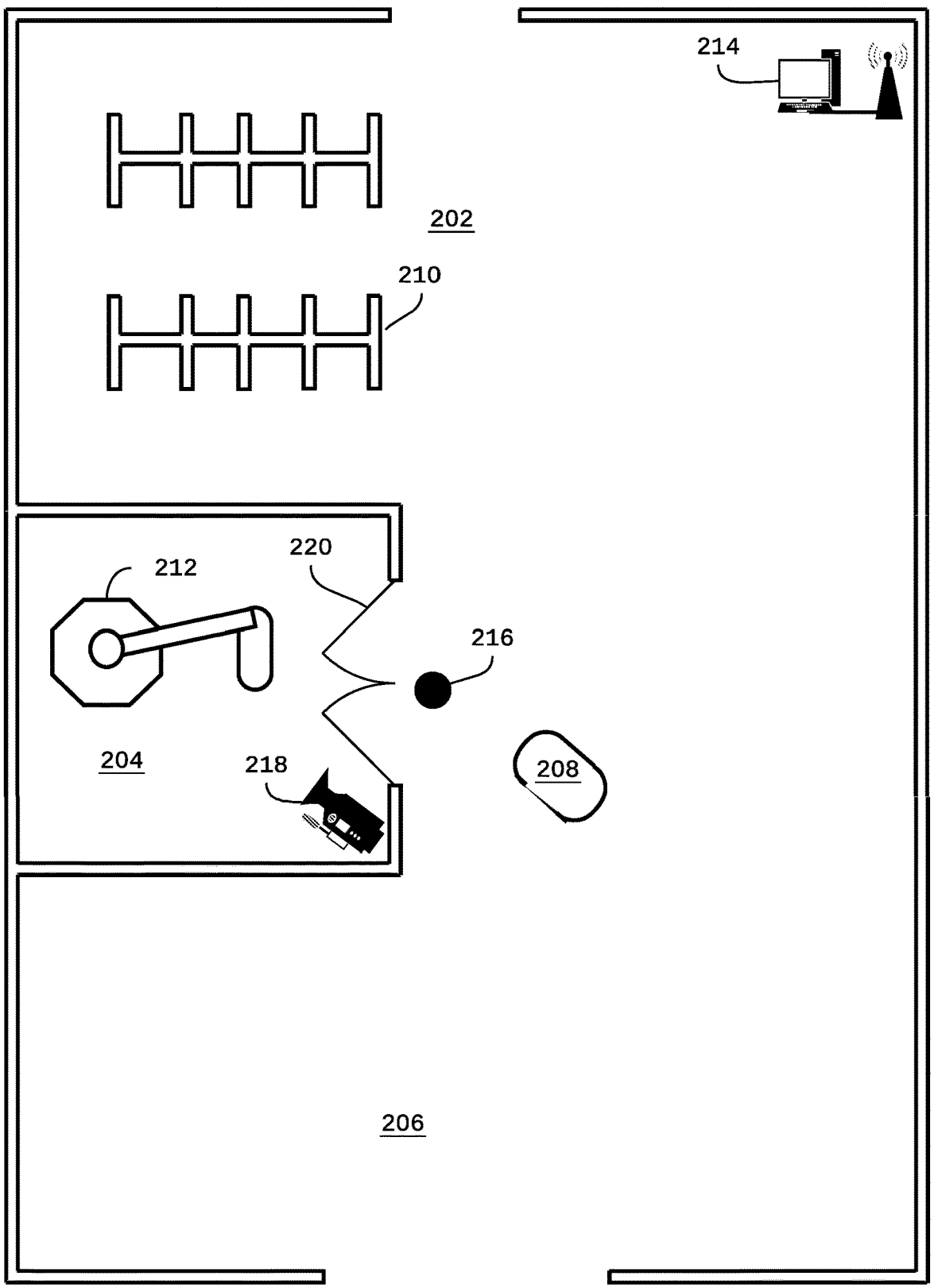
FIG. 2 is a plan view of an exemplary industrial facility in which a system for operating robotic equipment in a controlled zone is deployed according to some embodiments.

Referring to FIG. 2, there is shown a plan view of an industrial facility 200 in which a system for operating robotic equipment in a controlled zone is deployed. The industrial facility 200 includes a storage area 202, a controlled zone 204, and a shipping area 206. A simple example of production within the facility 200 can be described in which a self-driving material-transport vehicle 208 picks up a work product from shelves 210 in the storage area 202, delivers it to the controlled zone 204 where it is worked on by a machine 212, and then transported to the shipping area 206 for shipping. According to some embodiments, vehicle 208 may receive missions relating to the transport of the work product from a fleet-management system 214.

The vehicle 208 may use an electronic map (e.g. stored on the vehicle and/or on the fleet-management system 214) that identifies the controlled zone 204 (i.e. distinguishes the controlled zone 204 from the other areas of the facility 200) and/or that identifies an inspection location 216 associated with the controlled zone 204. In this case, as the vehicle 208 is within proximity of the controlled zone 204, and/or when the vehicle 204 arrives at the inspection location 216, it can cause environmental data to be captured in respect of the controlled zone 204.

According to some embodiments, the controlled zone 204 may be made uncontrolled based on factors such as time, day, feedback from the fleet-management system 214, or feedback from the vehicle 208. Feedback from the fleet-management system 214 or feedback from the vehicle 208 may also be fully or partially determined by sensors or other equipment mounted on the vehicle 208 or generally within the industrial facility 200.

According to some embodiments, the environmental data may be captured by one or more sensors on the vehicle 208, and/or a sensor 218 (shown as a video camera) mounted within the facility 200. In the case of the sensor 218 mounted within the facility 200, the sensor may be in communication with the vehicle 208 via the fleet-management system 214.

The environmental data may be of one or more types, and the sensors may correspondingly be of one or more types. For example, the environmental data may comprise a scan from a laser-based range-finding device (e.g. a LiDAR device) that may show the location of objects. The environmental data may comprise an image captured by a camera such as a video camera. The environmental data may comprise a temperature, heat map, or other thermal data related to the presence of a human or a moving/operating machine captured by a thermal sensor. The environmental data may comprise sounds captured by a microphone. The environmental data may comprise electromagnetic waves detected by a wireless communications receiver (e.g. a WiFi device).

The environmental data may also comprise data that span one or more time period, which allows for algorithms as known to those skilled in the art to also observe motion within the environment and from this derive a greater set of information about the environment than what static environmental data can provide.

Generally, the captured environmental data may be compared with known-good environmental data in order to determine whether the controlled zone 204 is in an expected state. For example, the controlled zone may be required to be in a safe state in order for the machine 212 to operate, and/or for the vehicle 208 to enter the controlled zone 204 through the doors 220. The known-good environmental data may also comprise a dataset that spans time, different known-good expected states, or a combination of both.

Figure 3:
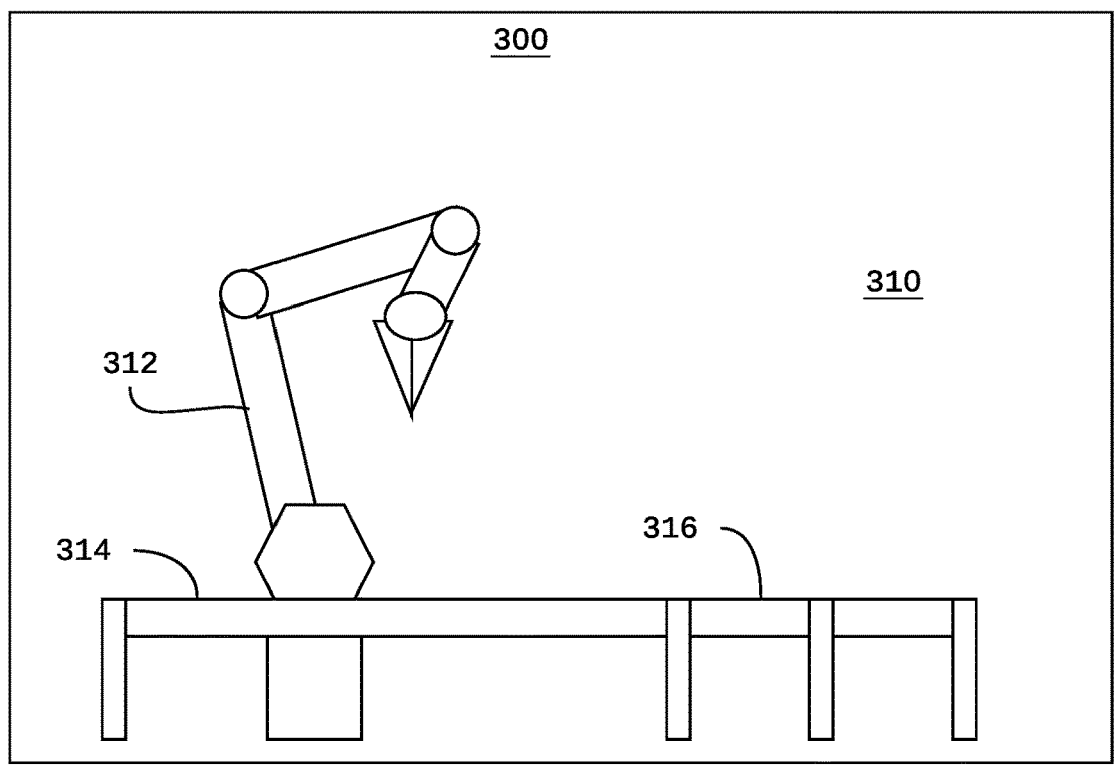
FIG. 3 is a visual representation of known-good environmental data and captured environmental data according to some embodiments.
Figure 3:
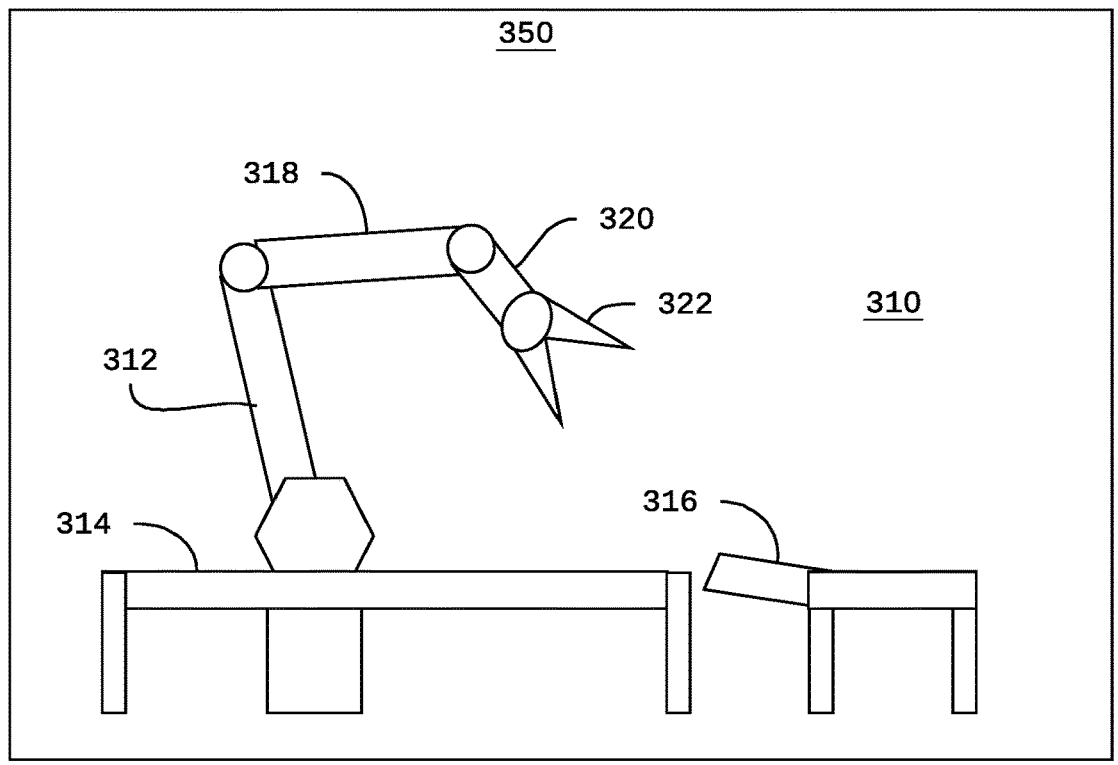

Referring to FIG. 3, there is shown known-good environmental data in the form of a known-good image 300 and captured environmental data in the form of a captured image 350. Generally, both images pertain to a controlled zone 310 in which a permanently-mounted robotic arm 312 is located. The robotic arm 312 is surrounded by a safety fence 314 with a gate 316 for allowing human operators to access the robotic arm 312.

According to some embodiments, the known-good image 300 may be considered to represent a safe state of the controlled zone 310. For example, safety protocol may require that the robotic arm 312 only function when there are no humans within the controlled zone 310. As such, it may also be desirable to ensure that other robotic equipment, such as self-driving vehicles (which may themselves have robotic arms mounted), do not enter the controlled zone 310 while the robotic arm 312 is operating. Accordingly, the captured image 350 may be considered to represent an unknown, present state of the controlled zone 310. As such, a comparison of the captured image 350 with the known-good image 300 can be used to determine whether the present state of the controlled zone 310 is the safe state.

A comparison of the example captured image 350 with the example known-good image 300 reveals that the captured image 350 includes environmental-change data over the known-good image 300. For example, in the known-good image 300, the robotic arm 312 is in a rest position, which may be associated with the robotic arm 312 being at rest and to performing an operation. In the captured image 350, however, the arm segments 318 and 320 are extended, and the end-effector 322 is in a deployment position. Furthermore, in the captured image 350, the gate 316 is ajar, whereas in the known-good image 300, the gate 316 is shut.

According to some embodiments, any or all of the differences between the images 300 and 350 may constitute environmental-change data. According to some embodiments, environmental-change data may be used to infer whether the controlled zone 310 is in a safe state or an unsafe state. For example, the displacement of the robotic arm 312 may imply that the robotic arm 312 is in the middle of performing an operation, or that the previous operation was not properly completed. The open gate 316 may imply that a human operator is currently within the safety fence 314 and in proximity to the robotic arm 312, or that a human operator has exited the controlled zone 310 but forgot to close the gate 316. According to some embodiments, the mere presence of environmental-change data may be sufficient to determine that the controlled zone 310 is in an unsafe state, without inferring a reason why.

According to some embodiments, the environmental-change data may also produce a level of confidence that the controlled zone 310 is in a safe state, or a level of confidence that the controlled zone 310 is in an unsafe state. These levels of confidence may be thresholded or otherwise evaluated in methods known to those skilled in the art to produce a binary "safe state" or "unsafe state" judgement.

Figure 4:
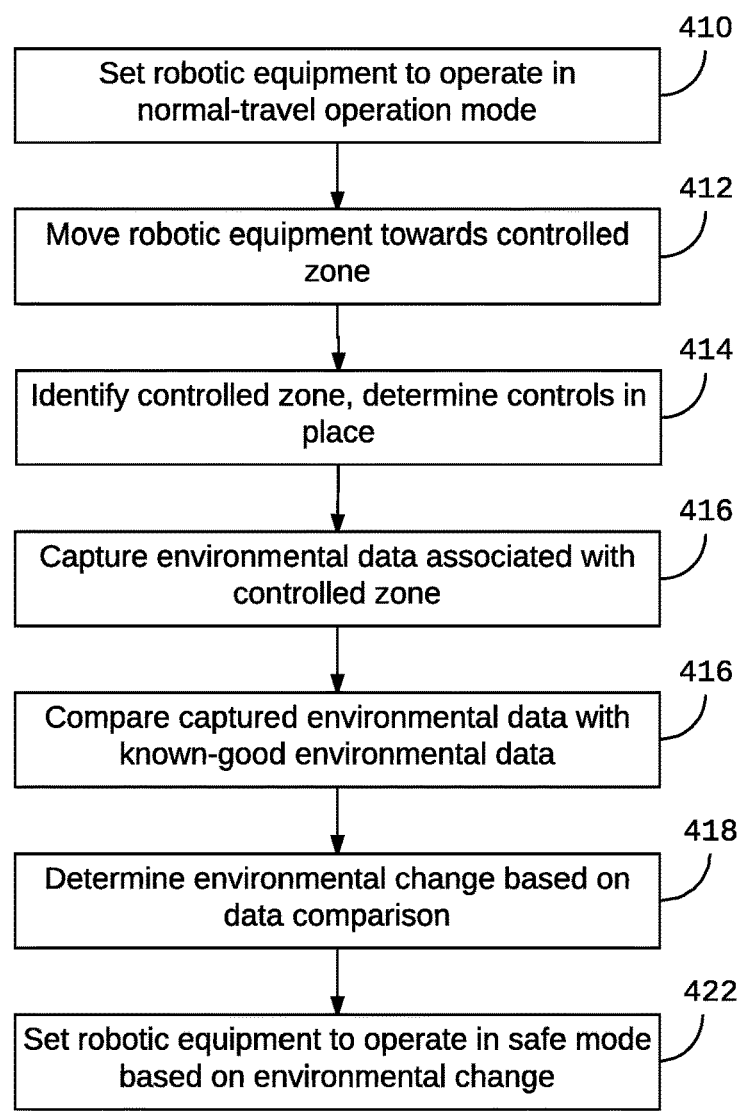
FIG. 4 is a flow diagram depicting a method for operating robotic equipment in a controlled zone, according to some embodiments.

Referring to FIG. 4, there is shown a method 400 for operating robotic equipment in a controlled zone, according to some embodiments. According to some embodiments, the method 400 may be stored as computer instructions on non-transitory computer-readable media on robotic equipment. According to some embodiments, the media may be on one or both of a self-driving material-transport vehicle and a fleet-management system. The robotic equipment (e.g. vehicle and/or fleet-management system) includes at least one processor and memory such that the computer instructions can be used to configure the processors to execute any or all of the steps of the method 400.

The method begins at step 410 when the robotic equipment is set to operate in a normal-travel operation mode. According to some embodiments, for example in the case of a self-driving vehicle, the normal-travel operation mode may allow for the vehicle to travel through common areas of an industrial facility (e.g. areas that are not specifically designated as "controlled zones"), which may include operating the vehicle at or below a maximum speed deemed appropriate for "normal" operation. According to some embodiments, for example in the case of a self-driving vehicle equipped with a manipulator arm, the normal-travel mode may allow for the vehicle to travel through common areas of the facility while with the operation of the manipulator arm disabled.

At step 412, the robotic equipment may be moved towards a controlled zone within the facility. According to the previous step, the robotic equipment is operating in the normal-travel operation mode while moving towards the controlled zone. For example, a self-driving vehicle may receive a mission from a fleet-management system that requires it to travel to and enter the controlled zone.

At step 414, a controlled zone is identified. This may include identifying a zone as a controlled zone, and/or determining whether controls are currently in place for the zone. In other words, according to some embodiments, a controlled zone may be defined in space, as well as time such that at some times, the space may be a controlled zone, and at other times, the space may not be a controlled zone. According to some embodiments, the particular controls in place for a controlled zone may change over time.

According to some embodiments, a controlled zone may be identified based on a corresponding location on the electronic map stored on a vehicle. According to some embodiments, a controlled zone may be identified based on indicia within the zone, for example, a visual (or other) reference. According to some embodiments, annunciators including lights and/or sounds may be used to indicate a controlled zone. In other words, some environmental data may be initially captured at step 414 in order to determine whether the robotic equipment is at or near a controlled zone.

Once a controlled zone has been identified, the particular controls in place may be determined. For example, when controlled zone has been identified in space, it may be subsequently necessary to determine whether the controls are in place at the relevant time as well.

According to some embodiments, the environmental data that is initially captured at step 414 may be used to set the control rules for the controlled zone. In other words, based on the environmental data captured by the robotic equipment, a determination may be made as to whether or not the zone should be subject to controls. For example, the robotic equipment may transmit the environmental data (or data related thereto) to a central system such as a fleet-management system in order to make such a determination.

At step 416, the environmental data associated with the controlled zone are captured. According to some embodiments, the environmental data may be captured by sensors on the robotic equipment. According to some embodiments, the environmental data may be captured by sensors external to the robotic equipment (e.g. a surveillance camera capturing images of the controlled zone). As previously described, the environmental data may be of various types.

According to some embodiments, the environmental data may be captured upon the robotic equipment arriving at or in proximity to the controlled zone or an inspection location associated with the controlled zone. For example, in the case that the environmental data are captured by sensors on the robotic equipment, a mission that includes a controlled zone may require the robotic equipment to travel via an inspection location such that the environmental data are captured from the inspection location. According to some embodiments, the electronic map of the facility used by the robotic equipment may comprise data that indicates a controlled zone (i.e. distinguishes the controlled zone from other parts of the facility), and/or an inspection location associated with the controlled zone.

At step 418, the captured environmental data from step 416 are compared with known-good environmental data. For example, if the environmental data comprise an image of the controlled zone, then the known-good environmental data may comprise an image of the controlled zone in a condition that is known to be safe. In some cases, a controlled zone may be considered or inferred to be in a "safe" state when there has been no human activity detected in the controlled zone thereby indicating the presence of a human. As such, if the captured image of the controlled zone indicated that an object in the controlled zone was not where it was expected to be as compared to the known-good image, or that a machine was not in a position or state expected based on the known-good image, or that a human or other unexpected object was present in the captured image, such indications would be detected through comparison with the known-good image.

At step 420, environmental-change data within the controlled zone are determined based on the comparison in step 418. In other words, if the captured environmental data do not sufficiently match the known-good environmental data, then environmental-change data can be determined. According to some embodiments, environmental-change data can imply a previous or current human presence within the controlled zone, or some other unexpected or anomalous condition within the controlled zone.

At step 422, the robotic equipment is set to operate in a safe mode based on the environmental-change data that were determined in step 420. According to some embodiments, for example in the case of a self-driving vehicle, the safe mode may prohibit the vehicle from entering the controlled zone, for example, by stopping the vehicle or maintaining the vehicle at the inspection location. According to some embodiments, the safe mode may limit the maximum speed of the robotic equipment to a maximum speed that is below the maximum speed of the robot equipment when it is operating in the normal-travel mode.

In the example of the robotic equipment comprising a manipulator arm, the safe mode may prohibit the operation of the manipulator arm while still allowing the operation (e.g. movement) of a self-driving vehicle on which the arm is mounted.

According to some embodiments, operating in the safe mode may comprise notifying a human operator that an unsafe condition has been identified within the controlled zone. For example, notification may be done directly (e.g. audio and/or visual annunciation) and/or by communicating through a centralized service such as a fleet-management system.

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that the term "coupled" used herein indicates that two elements can be directly coupled to one another or coupled to one another through one or more intermediate elements.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example and without limitation, the programmable computers may be a server, network appliance, embedded device, computer expansion module, a personal computer, laptop, a wireless device or any other computing device capable of being configured to carry out the methods described herein.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Various embodiments have been described herein by way of example only. Various modification and variations may be made to these example embodiments without departing from the spirit and scope of the invention, which is limited only by the appended claims.

We claim:

1. A method for operating a robotic equipment in a facility having a
controlled zone, the method comprising:
identifying a predetermined inspection location associated with the controlled zone, the predetermined inspection location being defined relative to the controlled zone to enable the robotic equipment to capture environmental data in respect of an operational state of a machine located in the controlled zone;
determining that the robotic equipment is at the predetermined inspection location;
while the robotic equipment is at the predetermined inspection location, using at least one sensor at the robotic equipment to capture the environmental data;
determining whether the controlled zone is in a safe state based on the operational state of the machine by comparing the captured environmental data with a safe-state environmental data, the safe-state environmental data being associated with the operational state of the machine when the controlled zone is in the safe state; and
in response to determining the controlled zone is not in the safe state, operating the robotic equipment in a safe mode of operation, otherwise, operating the robotic equipment in a normal mode of operation.

2. The method of claim 1 further comprises:
operating the robotic equipment to generate an alert corresponding to the operational state of the machine.

3. The method of claim 2, wherein the alert comprises one or more of an audio alert, a visual alert and a wireless signal transmitted via a communication transmitter at the robotic equipment.

4. The method of claim 1 further comprises:
storing the captured environmental data in association with a time period at which the environmental data is captured.

5. The method of claim 1 further comprises:
maintaining a historical record of the operational state of the machine based on the environmental data captured at one or more time periods.

6. The method of claim 1, wherein operating the robotic equipment in the safe mode of operation comprises preventing the robotic equipment from entering the controlled zone.

7. The method of claim 1, wherein operating the robotic equipment in the safe mode of operation comprises operating the robotic equipment at an operating speed lower than a maximum speed of the robotic equipment when operating in the normal mode.

8. The method of claim 1, wherein operating the robotic equipment in the safe mode of operation comprises preventing a manipulator arm at the robotic equipment from moving.

9. The method of claim 1, wherein using the at least one sensor to capture the environmental data comprises capturing an image of the controlled zone.

10. The method of claim 1, wherein the robotic equipment comprises a self-driving material-transport vehicle.

11. A self-driving vehicle for operating within a facility having a controlled zone, the self-driving vehicle comprising:
a vehicle chassis;
at least one drive motor mounted on the chassis for driving at least one drive wheel;
at least one sensor mounted on the chassis;
a processor in communication with the at least one drive motor and at least one sensor; and
a non-transitory computer-readable medium having instructions stored thereon for configuring the processor to:
identify a predetermined inspection location associated with the controlled zone, the predetermined inspection location being defined relative to the controlled zone to enable the self-driving vehicle to capture environmental data in respect of an operational state of a machine located in the controlled zone;
determine that the self-driving vehicle is at the predetermined inspection location;
while the self-driving vehicle is at the predetermined inspection location, use the at least one sensor to capture the environmental data;
determine whether the controlled zone is in a safe state based on the operational state of the machine by comparing the captured environmental data with a safe-state environmental data, the safe-state environmental data being associated with the operational state of the machine when the controlled zone is in the safe state; and
in response to determining the controlled zone is not in the safe state, operate the self-driving vehicle in a safe mode of operation, otherwise, operate the self-driving vehicle in a normal mode of operation.

12. The self-driving vehicle of claim 11, wherein the processor is further configured to generate an alert corresponding to the operational state of the machine.

13. The self-driving vehicle of claim 12, wherein the alert comprises one or more of an audio alert, a visual alert and a wireless signal transmitted via a communication transmitter of the self-driving vehicle.

14. The self-driving vehicle of claim 11, wherein the processor is further configured to store the captured environmental data in association with a time period at which the environmental data is captured.

15. The self-driving vehicle of claim 11 wherein the processor is further configured to maintain a historical record of the operational state of the machine based on the environmental data captured at one or more time periods.

16. The self-driving vehicle of claim 11, wherein the processor is further configured to, when operating the self-driving vehicle in the safe mode of operation, prevent the self-driving vehicle from entering the controlled zone.

17. The self-driving vehicle of claim 11, wherein the processor is further configured to, when operating the self-driving vehicle in the safe mode of operation, operate the self-driving vehicle at an operating speed lower than a maximum speed of the self-driving vehicle when operating in the normal mode.

18. The self-driving vehicle of claim 11 further comprises a manipulator arm mounted to the vehicle chassis and the processor is further configured to, when operating the self-driving vehicle in the safe mode of operation, prevent the manipulator arm from moving.

19. The self-driving vehicle of claim 11, wherein the at least one sensor comprises a camera and the processor is further configured to, when using the at least one sensor to capture the environmental data, to capture an image of the controlled zone with the camera.

20. The self-driving vehicle of claim 11, wherein the at least one sensor comprises a LiDAR device and the processor is further configured to, when using the at least one sensor to capture the environmental data, capture LiDAR scan data with the LiDAR device.

* * * * *